E. W. KNAPP.
WAGON.
APPLICATION FILED AUG. 28, 1911. RENEWED MAY 29, 1913.
1,067,988.
Patented July 22, 1913.
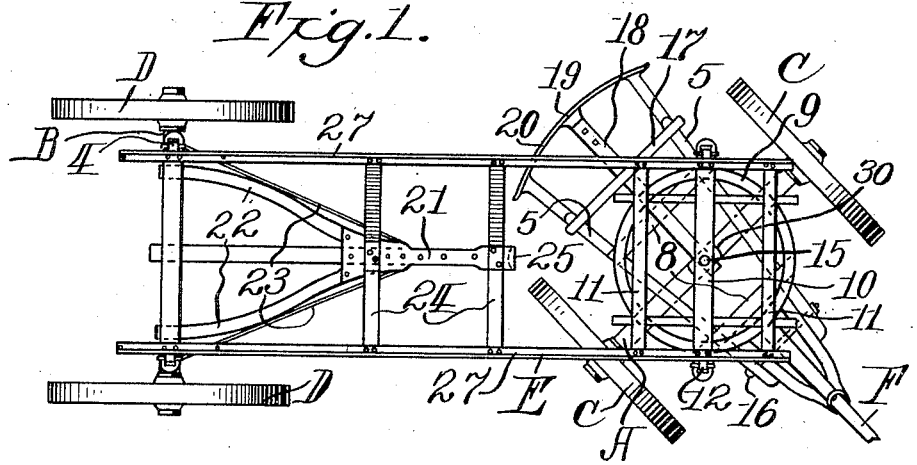
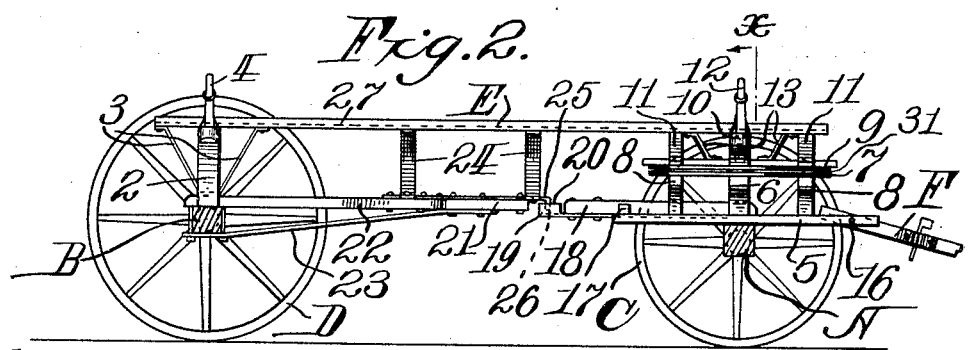
Witnesses:
M. C. Adams.
H. L. Fischer.
Inventor:
Everett W. Knapp,
by: J. P. Bradbury.
Attorney.

UNITED STATES PATENT OFFICE.

EVERETT W. KNAPP, OF ST. PAUL, MINNESOTA.

WAGON.

1,067,988.      Specification of Letters Patent.      Patented July 22, 1913.

Application filed August 28, 1911, Serial No. 646,451. Renewed May 29, 1913. Serial No. 770,794.

*To all whom it may concern:*

Be it known that I, EVERETT W. KNAPP, a citizen of the United States, residing at St. Paul, in the county of Ramsey and State of Minnesota, have invented a new and useful Improvement in Wagons, of which the following is a specification.

My invention relates to improvements in wagons and its object is to provide a wagon having a separable reach enabling the steering axle of the wagon to make a very short turn by revolving under the body or bed of the wagon and carrying one of its wheels past the broken or detached end of the reach.

Numerous devices have been designed to permit the shorter turning of a wagon but my device makes possible a shorter turn without reduction in the size of the front wheels and without the danger of tipping the wagon bed which results from the ordinary design of reach and axle connecting parts, and maintaining the reach connection between the front and rear axles during the forward movement of the wagon.

In the drawings with which I have illustrated my invention and which form part of this specification, Figure 1 is a plan of a wagon bed fitted with my invention; Fig. 2 is a sectional elevation of the running gear and bed of a wagon; Fig. 3 is a sectional view of the reach parts as shown in Fig. 2, and Fig. 4 is a section on the line X—X, Fig. 2.

In the above drawings I have illustrated a wagon having a front axle A and a rear axle B on which are journaled in the ordinary manner the front and rear wheels C and D respectively. A wagon bed E is supported on the axles A and B, the rear axle having a bolster 2 of ordinary design fixed thereon to carry the bed E. Braces 3 extend from the top of the axle B upon each side of the bolster 2, to the bed E at front and rear of the axle. Wagon stakes 4 are fixed in the ends of the bolster 2 to prevent lateral movement of the bed E upon the bolster. Front hounds 5 rest upon the front axle A and carry a lower bolster 6 fixed thereto. The fifth wheel 7 of the wagon rests upon the bolster 6 and upon two auxiliary bolsters 8 which are directly supported by the hounds. The fifth wheel 7 forms a complete circle and is illustrated as having a diameter of substantially the width of the wagon bed and supporting a coöperating circle 9 attached to the upper bolsters 10 and 11. The circles 7 and 9 may be of any desired diameter. The bolster 10 rests directly on the lower bolster 6 at its center, having two wear plates 30 comparatively short in length between them to receive the load of the wagon bed E and the friction of turning the axle in guiding the wagon. The circles are designed to have a slight clearance space 31 between them when the wagon is in normal position to prevent friction in turning. Any tendency of the wagon bed to tip throws the circles into contact and supports the load on the front hounds. Wagon stakes 12 are fixed in the ends of the bolster 10 to prevent the lateral movement of the bed E which rests upon the bolsters 10 and 11 and is fixed thereto.

Braces 13 may be inserted between the wagon bed E and the bolster 10 to brace the wagon bed in its connection with the axle A. A king bolt 15 passes downward through the bolster 10, the lower bolster 6, and the axle A to permit the turning of the front axle in steering the wagon. A suitable tongue F is attached to the front hounds 5 at their forward end by means of a bolt 16. The hounds 5 are braced near their rear ends by a crosspiece 17 attached to the hounds and to the front or movable part 18 of the wagon reach which lies on the middle line of the wagon and is connected with the front axle A adjacent to the king bolt 15. A clutch part 19 is attached to the rear ends of the hounds 5 and the front reach part 18. The clutch part has an upwardly extending rim or lip 20 which extends horizontally through a considerable arc, having the axis of the king bolt 15 at its center.

A rear or fixed reach portion 21 is attached to the rear axle between the axle and the bolster 2, and is braced therefrom in the ordinary manner by rear hounds 22 attached to the axle B and to the reach 21 and further braced from the axle B by metal rods 23. The forward end of the rear reach portion 21 is braced vertically and sidewise from the wagon bed E by means of braces 24 extending from the bed E diagonally to the reach and upward to the opposite side of the bed.

The front end of the reach 21 is fitted with a clutch part 25 fixed to the reach and having a downstanding lip 26 which is adapted to engage the rim 20 of the clutch 19 when the front axle A is substantially transverse to the wagon bed and produce a direct reach action longitudinally of the wagon during the forward movement thereof. This action carries the pull from the front hounds and axle through the reach to the rear axle during the connection of the reach parts. The clutch part 25 is relatively narrow as compared with the clutch part 19.

A rotation of the axle A upon the king bolt 15 causes the rim 20 of the clutch 19 to slide through the clutch 25 in engagement with the lip 26 until the extremity of the rim 20 is reached when the clutch 19 becomes disengaged from the clutch 25 and the reach 21 causing a break in the reach action of the reach parts 18 and 21. The position of the clutch 25 longitudinally of the wagon is such that the movement of the wheel C beneath the wagon bed E caused by the turning of the axle A does not bring the wheel C into contact with the end of the reach 21 or clutch 25 and the axle A is free to turn as far as the tongue F or a team attached thereto will permit. A very short turn may be made in this way, and the breaking of a reach by a wheel in turning is impossible.

The bed E of the wagon as illustrated consists of side stringers 27 formed of angle iron and resting upon the bolsters 2, 10 and 11. The side stringers 27 are designed to receive a wagon box rack or similar receptacle thereon and to furnish a vertical support for the reach part 21. The bed may be formed with a continuous layer of planking if desired.

The design of the fifth wheel 7 as previously described is adapted to a more complete support of the wagon bed while making a short turn since the ends of the bolster 10 are supported by the circle 9 resting upon the circle 7 in any position of the axle. This form of fifth wheel is also designed for the ready attachment of my device to old reach wagons by using the old bolster 10 and hounds 5 and adding the new parts.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A reach coupling for a wagon, comprising in combination, a rear axle, a front axle, a wagon bed supported on said axles, said front axle being rotatively connected with said bed, a fixed reach part attached to said rear axle and braced from said bed and a movable reach part attached to said front axle, said reach parts being formed with a rim and overlapping lip adapted to separably connect said reach parts whereby a direct forward pulling connection is formed during a partial rotation of said front axle and to disconnect them to allow a further rotation of said axle beyond fixed limits.

2. In a wagon, a pair of supporting axles one of which is rotatable to guide said wagon and means connected with said axles to connect them directly during the substantially straight line movement of said wagon and to disconnect them when said wagon is turning, said means having a rim and overlapping engagement forming a straight line pull connection separable when said pull is out of a straight line and beyond fixed limits.

3. A clutch reach for a wagon, comprising in combination, a rear axle and a front axle, a reach part attached to each of said axles and having their ends formed with a rim and engaging lip adapted to clutch each other separably during a partial rotation of said axles from a normal position and to disengage to permit a further relative rotation of said axles, and a wagon bed supported on said axles and adapted to maintain said axles in operative position during the disengagement of said reach parts.

In testimony whereof, I have signed my name to this specification, in the presence of two subscribing witnesses.

EVERETT W. KNAPP.

Witnesses:
H. L. Fischer,
F. G. Bradbury.

Copies of this patent may be obtained for five cents each, by addressing the " Commissioner of Patents, Washington, D. C."